United States Patent
Hottinen

(10) Patent No.: US 7,376,428 B2
(45) Date of Patent: May 20, 2008

(54) POSITIONING METHOD AND RADIO SYSTEM

(75) Inventor: Ari Hottinen, Espoo (FI)

(73) Assignee: Nokia Siemens Networks OY, Espoo (FI)

( * ) Notice: Subject to any disclaimer, the term of this patent is extended or adjusted under 35 U.S.C. 154(b) by 660 days.

(21) Appl. No.: 10/616,292

(22) Filed: Jul. 10, 2003

(65) Prior Publication Data
US 2004/0072579 A1 Apr. 15, 2004

Related U.S. Application Data

(63) Continuation of application No. PCT/FI02/00022, filed on Jan. 10, 2002.

(30) Foreign Application Priority Data

Jan. 12, 2001 (FI) .................................. 20010079

(51) Int. Cl.
*H04Q 7/20* (2006.01)
*H04M 1/00* (2006.01)
*H04B 1/38* (2006.01)

(52) U.S. Cl. .............................. 455/456.1; 455/456.2; 455/456.6; 455/550.1; 455/556.2; 455/561; 455/562.1; 455/575.7

(58) Field of Classification Search .. 455/456.1–456.6, 455/404.1, 404.2, 457–458, 524–526, 550.1, 455/556.2, 560–561, 562.1, 101–103, 91, 455/130, 132, 143, 15, 575.7, 115.1, 13.3; 370/310.1, 319–321, 328, 395.3; 343/907, 343/844, 824, 729; 342/423, 437, 445; 375/267, 375/295, 299, 347
See application file for complete search history.

(56) References Cited

U.S. PATENT DOCUMENTS

| | | | |
|---|---|---|---|
| 6,026,304 A | 2/2000 | Hilsenrath et al. | |
| 6,064,339 A | 5/2000 | Wax et al. | |
| 6,167,274 A | 12/2000 | Smith | |
| 6,249,680 B1 * | 6/2001 | Wax et al. | ............... 455/456.2 |
| 6,275,186 B1 * | 8/2001 | Kong | .......................... 342/363 |
| 6,351,499 B1 * | 2/2002 | Paulraj et al. | ............... 375/267 |

(Continued)

FOREIGN PATENT DOCUMENTS

WO WO 99/65161 12/1999

OTHER PUBLICATIONS

"Overview of Radiolocation in CDMA Cellular Systems", Caffery et al, IEEE Communications Magazine, Apr. 1998, pp. 38-45.

(Continued)

*Primary Examiner*—Meless Zewdu
(74) *Attorney, Agent, or Firm*—Squire, Sanders & Dempsey, L.L.P.

(57) ABSTRACT

The invention relates to a method for performing positioning in a radio system. At least two different antenna elements of an array antenna of a base station transmit mutually non-interfering identifier signals that are received by a terminal that generates a spatial signature of the received signals. Either the terminal or the network part of the radio system defines the location of a transmitter or receiver by means of the spatial signature of the signals.

65 Claims, 5 Drawing Sheets

U.S. PATENT DOCUMENTS

| | | | | |
|---|---|---|---|---|
| 6,501,747 | B1* | 12/2002 | Friedlander et al. | 370/342 |
| 6,671,514 | B1* | 12/2003 | Cedervall et al. | 455/456.1 |
| 6,731,689 | B2* | 5/2004 | Dogan | 375/259 |
| 6,738,020 | B1* | 5/2004 | Lindskog et al. | 342/377 |
| 6,870,808 | B1* | 3/2005 | Liu et al. | 370/203 |
| 2002/0094820 | A1* | 7/2002 | Keranen et al. | 455/456 |
| 2005/0009528 | A1* | 1/2005 | Iwamura et al. | 455/446 |

OTHER PUBLICATIONS

"Solving the SVD Updating Problem of Subspace Tracking on a Fixed Sized Linear Array of Processors", Sengupta et al, International Conference on Acustics, Speech and Signal Processing (ICASSP), vol. 5, pp. 4137-4140, Apr. 1997.

"Closed-Loop Transmit Diversity Techniques for Multi-Element Transceivers", Hottinen et al, Vehicular Technology Conference, IEEE VTS Fall 2000, vol. 1, pp. 70-73, 2000, no month listed.

* cited by examiner

POSITIONING METHOD AND RADIO SYSTEM

This is a Continuation of International Application No. PCT/FI02/00022 filed Jan. 10, 2002, which designated the U.S. and was published under PCT Article 21(2) in English.

BACKGROUND OF THE INVENTION

1. Field of the Invention

The invention relates to performing positioning in a radio system.

2. Description of the Related Art

In CDMA (Code Division Multiple Access), a narrow-band data signal of a user is modulated with a spreading code having a wider band than the data signal to a relatively wide band. Ln a WCDMA (Wideband CDMA) radio system, the bandwidth is yet considerably wider, because current mobile networks want to provide even more versatile services to users.

In radio systems, data transmission is done in duplex mode that can be implemented using the FDD (Frequency-Division Duplex) or TDD (Time-Division Duplex) principle. In an FDD solution, reception and transmission take place on different frequencies. In a TDD solution, reception and transmission take place at different time instants, but the frequency of the received signal and that of the transmitted signal are the same.

In WCDMA radio systems in particular, signal reception and transmission can be done with a diversity antenna that comprises an array of antenna elements. Signals are phased in relation to each other in a desired manner to make sure that the directional pattern formed by the antenna array is in the desired direction and shape. In practice, the phasing is done by multiplying the digital baseband antenna signal of each antenna element by complex coefficients that shape the directional pattern.

One of the most common positioning methods of a terminal is to measure the signal timing between the terminal and at least three base stations to find out the propagation delay of the signals between the terminal and each base station. The distance of the terminal from the base stations can be shown as a circle around each base station, because the direction of the terminal from the base stations is in most cases not known, and the radius of each circle represents the distance of the terminal from the base station. Each of the at least three circles has one common intersection point that is the location estimate of the terminal. Known measuring methods used in terminal positioning include the TOA (Time Of Arrival) measurement and the TDOA (Time Difference Of Arrival) measurement.

The TOA and TDOA positioning methods are, however, hampered by a problem caused by the distance of the subscriber terminal to the base station, i.e. near-far problem. In terminal positioning, this problem is also called a receiving problem. Other base stations do not hear a terminal that is close to one base station and the terminal does not hear the other base stations because of the interfering transmission of the nearby base station. When the signal propagation delay between the terminal and at least three base stations cannot be measured, neither can the position of the terminal be determined in this manner. In addition, methods based purely on delay measurements are often inaccurate, and it is difficult to find out the locations of the desired or first delay components in a multipath channel.

If a receiver comprises a diversity antenna or, more generally, at least a second antenna element, it is also possible to determine the location of a transmitter by means of the direction of reception. Usually, this is done by having several base stations measure the angle of arrival (AoA) of a signal transmitted by a terminal, whereby the location of the terminal can be determined to an intersection of two straight lines. Positioning is described in greater detail in publication: *Overview of radiolocation in CDMA cellular systems*, J. J. Caffery, Jr and G. L. Stuber, IEEE, 1998, which is incorporated herein as reference.

Determining the direction of reception is, however, a demanding task that requires good array antenna calibration and computationally demanding parameter estimation methods. Determining the direction of reception also requires a great deal of signalling from the transmitter to the base station and thus uses up a lot of capacity in the transmission direction from the terminal to the base station. In addition, the solution only enables positioning by a network element that requires the terminal to transmit something to the network element. There are, however, situations and services, in which the terminal must be capable of exact positioning, but the network element should not be able to position the terminal.

SUMMARY OF THE INVENTION

It is thus an object of the invention to provide an improved method and a radio system implementing the method for enhancing positioning. This is achieved by a method for performing positioning in a radio system, which comprises the steps of transmitting an identifier signal suited for channel estimation through at least two different channels, receiving said at least two identifier signals, estimating by means of the received identifier signals a spatial signature of the channels, and defining by means of the spatial signature of the signals information related to the location of a receiver or transmitter.

The invention also relates to a radio system comprising as a transmitter and receiver at least one base station and terminal, of which at least the transmitter comprises an antenna that comprises at least two antenna elements, and which radio system performs positioning. Further, the transmitter is adapted to transmit an identifier signal suited for channel estimation through at least two different channels, the receiver is adapted to receive said at least two identifier signals, the receiver is adapted to form by means of the received identifier signals a spatial signature of the channels, and, for the purpose of positioning, the radio system is adapted to define by means of the spatial signature of the signals information related to the location of the receiver or transmitter.

Preferred embodiments of the invention are disclosed in the dependent claims.

The invention is based on transmitting to a receiver through at least two different channels at least two at least partly uncorrelated signals, by means of which a spatial signature of a channel is estimated so as to be able to define the direction between the receiver and transmitter. It is also possible to define the location of the transmitter or receiver.

The method and system of the invention provide several advantages. Signalling in the radio system is reduced, which reduces the need for capacity from the terminal to the base station. The accuracy of the positioning also increases, because the method enables the estimation of accurate channel estimates and/or spatial signatures, and their use in positioning. In addition, the solution also makes possible a situation, in which the terminal does not necessarily need to signal anything to the base station, and the terminal can position itself without the network element knowing where the terminal is. The positioning can also be done in the network element. The base station or some other transmitter can also be positioned.

BRIEF DESCRIPTION OF THE FIGURES

The invention will now be described in greater detail by means of preferred embodiments and with reference to the attached drawings, in which.

DETAILED DESCRIPTION OF THE PREFERRED EMBODIMENTS

The presented embodiments can be applied to telecommunications systems that utilize transmission diversity. One such telecommunications system is a wideband FDD-mode or TDD-mode WCDMA radio system utilizing spread-spectrum transmission, without limiting the invention to it, however. In the following example, the preferred embodiments of the invention are described in a universal mobile system employing wideband code-division multiple access.

Figure 1:
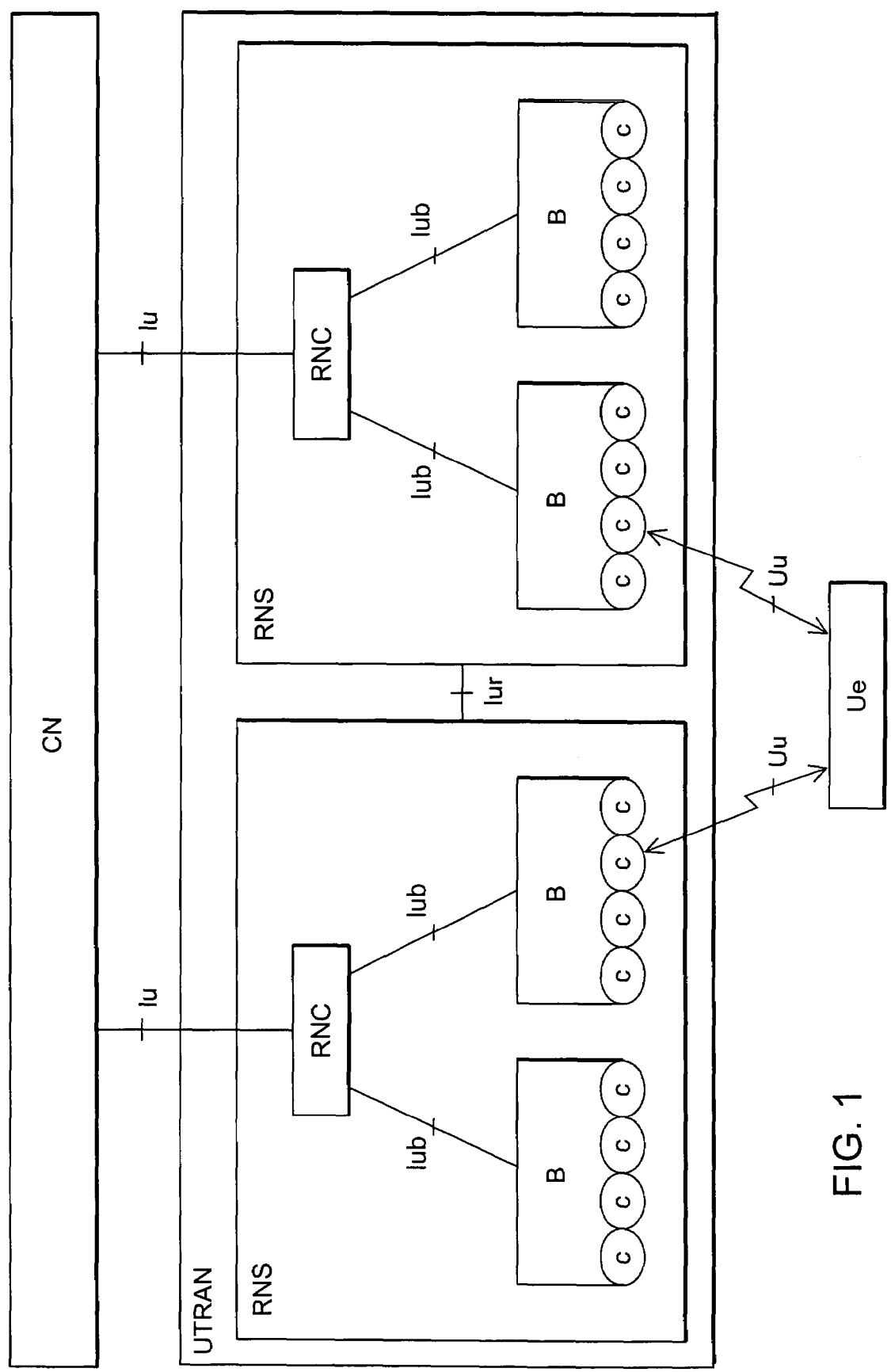
FIG. 1 shows the structure of a mobile system.

The structure of a mobile system is described by way of example with reference to FIG. 1. The main parts of the mobile system are a core network CN, a UMTS (Universal Mobile Telephone System) terrestrial radio access network UTRAN and user equipment UE. The interface between CN and UTRAN is called Iu and the air interface between UTRAN and UE is called Uu.

UTRAN is made up of radio network subsystems RNS. The interface between RNSs is called Iur. RNS is made up of a radio network controller RNC and one or more nodes B. The interface between RNC and B is called Iub. The service area, i.e. cell, of the node B is marked with C in the figure.

Figure 2:
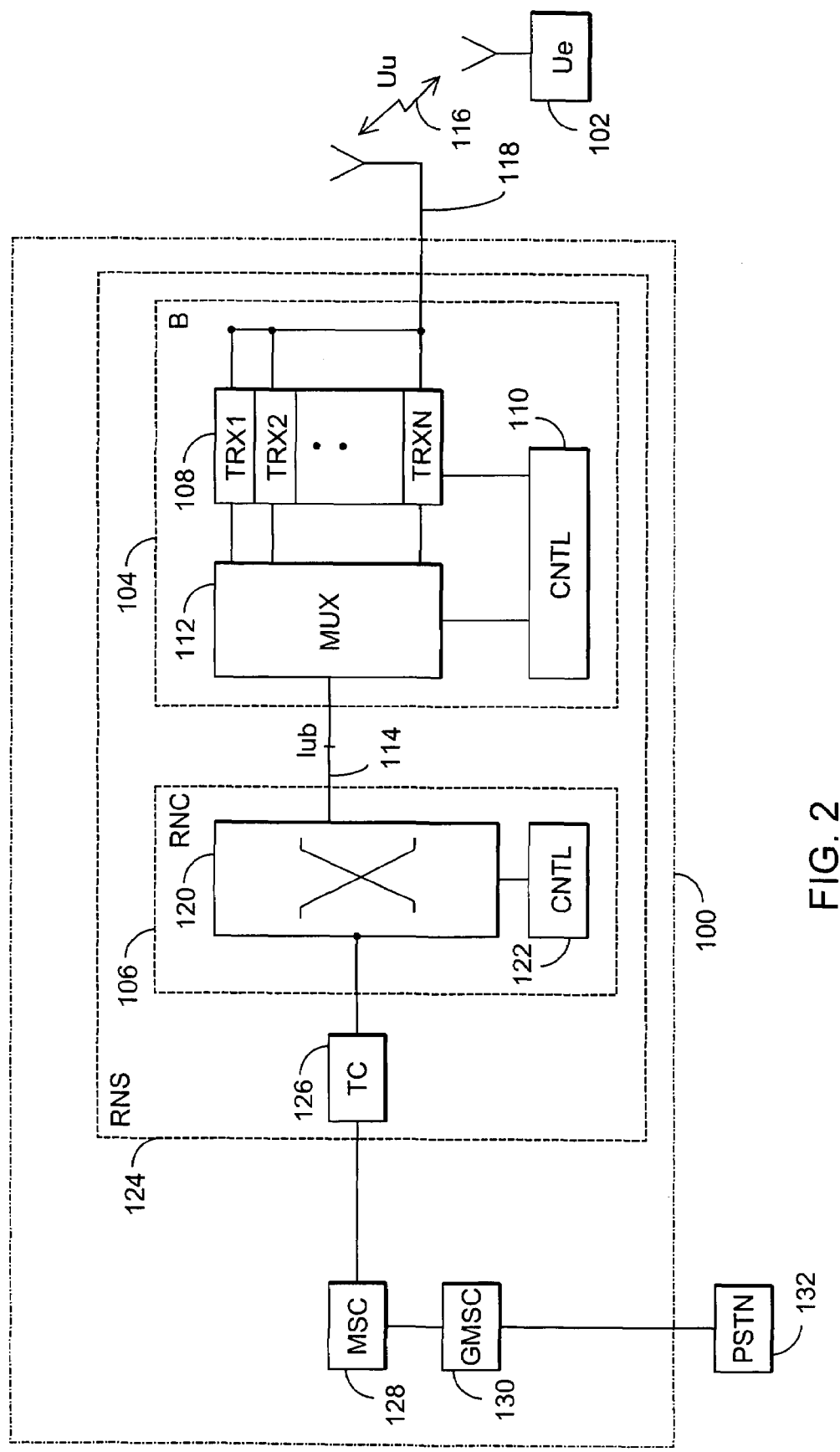
FIG. 2 shows a cellular radio system.

The description in FIG. 1 is rather general, so it is clarified in the more detailed example of a cellular radio system in FIG. 2. FIG. 2 only contains the most essential blocks, but it is apparent to a person skilled in the art that a conventional cellular radio network also comprises other functions and structures that need not be described in more detail herein. It should also be noted that FIG. 2 only shows one exemplary structure. In systems of the invention, the details may differ from those shown in FIG. 2, but these differences have no relevance to the invention.

A cellular radio network typically comprises a fixed network infrastructure, i.e. network part 100, and subscriber terminals 102 that may be fixedly installed terminals, terminals installed in a vehicle or portable terminals. The network part 100 has base stations 104. A base station corresponds to a node B of the previous figure. A radio network controller 106 controls in a centralised manner several base stations 104 connected to it. The base station 104 has transceivers 108 and a multiplexing unit 112.

The base station 104 further has a control unit 110 that controls the operation of the transceivers 108 and the multiplexer 112. The multiplexer 112 places the traffic and control channels used by several transceivers 108 on one transmission connection 114. The transmission connection 114 forms an interface Iub.

The transceivers 108 of the base station 104 are connected to an antenna unit 118 implementing a bi-directional radio connection 116 to the subscriber terminal 102. The structure of frames transmitted in the bi-directional radio connection 116 is defined specifically for each system and is called an air interface Uu.

The radio network controller 106 comprises a group switching field 120 and a control unit 122. The group switching field 120 is used to switch speech and data and to connect signalling circuits. A radio network subsystem 124 formed by the base station 104 and the radio network controller 106 also comprises a transcoder 126. The transcoder 126 is usually located as close to a mobile switching centre 128 as possible, because speech can then be transmitted in cellular radio network format between the transcoder 126 and the radio network controller 106, saving transmission capacity.

The transcoder 126 transforms the different digital speech coding formats used between a public telephone network and a radio telephone network to be compatible with each other, for instance from a fixed network format to a cellular radio network format and vice versa. The control unit 122 takes care of call control, mobility management, collection of statistics and signalling.

FIG. 2 further shows the mobile switching centre 128 and a gateway mobile switching centre 130 that manages the external connections of the mobile telephone system, in this example to a public telephone network 132.

Figure 3:
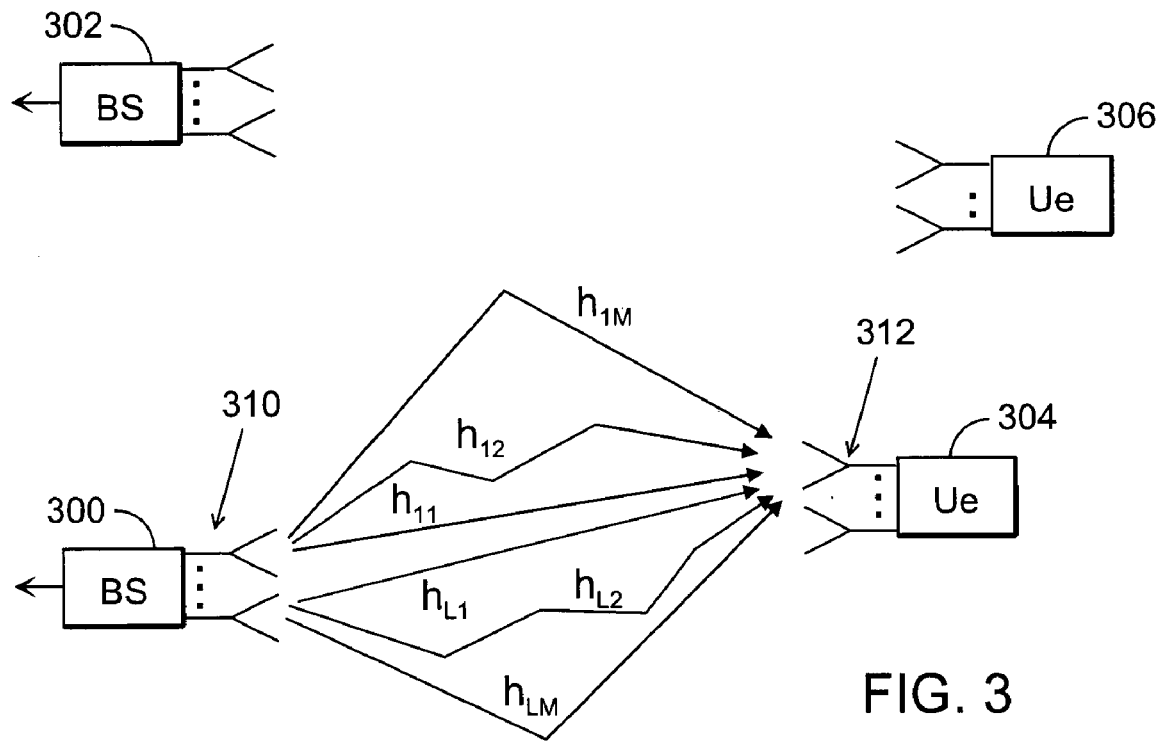
FIG. 3 shows signal propagation between a base station and a terminal.

Let us now examine the present solution by means of FIG. 3. The radio system comprises at least one base station 300 to 302 and at least one terminal 304 to 306. In the present solution, the base station 300 comprises an array antenna 310 that comprises L antenna elements. There are, however, at least two antenna elements. The terminal 304 can also comprise an array antenna 312 that has N antenna elements. The minimum number of antenna elements in the terminal 304 is one, i.e. the terminal 304 does not necessarily need an array antenna.

In the present solution, at least two antenna elements 310 or transmission antenna routes (this can be a lobe or a single antenna) of the base station 300 transmit identifier signals that differ from each other and that the terminal receives. The identifier signals are directed in a desired manner by multiplying the signals to be transmitted by complex weighting coefficients $w=[w_1, \ldots, w_L]$, where L is the number of antenna elements. The complex weighting coefficients for different identifier signals are preferably orthogonal with respect to each other, whereby the identifier signals can be made to cover the entire cell or sector. In the case of ULA (Uniform Linear Array), for instance, the weighting coefficients w can also be presented in a form parametrized by the transmission direction:

$$w(\theta)=[1, e^{(j2\pi d\ sin(\theta)/\lambda)}, \ldots, e^{(j2\pi(L-1)d\ sin(\theta)/\lambda)}]^T/\sqrt{L}, \qquad (1)$$

where the coefficients are proportioned to the coefficient of the first antenna, $\theta$ parametrizes the transmission direction and d is the distance of the antenna elements from each other. Different antenna geometries typically have different parametrizations. The lobes formed by the identifier signals are preferably orthogonal, whereby $w(\theta_1)^T \cdot w(\theta_2)=0$, where the L-dimensional vectors $w(\theta_1)$ and $w(\theta_2)$ describe the weighting coefficients of the identifier signals in different antenna elements. It can also be assumed that different identifier signals are transmitted from different antenna elements.

Generally, the identifier signals transmitted through different lobes or antenna elements to different channels can be mutually orthogonal, uncorrelated or independent, which makes it possible to estimate channel parameters in the terminal. The identifier signals are pilot signals, for instance, that the receiver knows in advance but whose codes, frequencies, transmission time instants or transmission directions differ from each other. For instance, in a 3G WCDMA system, Common Pilot Channel (CPICH) signals fulfil this condition when transmission antenna diversity is used. Identifier signals can be distinguished from each other during reception and the impulse response of the signals can be estimated in the receiving unit. The signals are preferably orthogonal CPICH pilot signals characteristic of antenna elements (or lobes) that can be implemented by orthogonal channelling codes or by means of orthogonal symbol sequences. Because signals transmitted from antennas (or antenna lobes) are distinguished from each other during reception, information on the signal channels and especially information related to the channel location (properties related to location) can be measured, i.e. the spatial signature of the signals can be estimated. The spatial signature of signals is described in greater detail in patent publication U.S. Pat. No. 6,064,339, which is incorporated herein by reference. For instance, a momentary estimate describing a channel, the average of several channel estimates, or some other property describing the structure of a channel can be used as a spatial signature of a signal. However, it is especially advantageous to use as the spatial signature a variable that depends mainly on the location of a terminal and not on a momentary fade. Such a variable is obtained by using several non-correlated or slightly correlating channel matrices, by means of which the structure related to the location of the signal can be estimated. In particular, it is possible to calculate an average of several covariance matrices (in which at least two measuring time instants having an interval that exceeds a temporal coherence time of the channel are used, and/or at least two covariance matrices that are estimated on different transmission frequencies, and/or at least two receiving antennas, and the covariance matrices are correspondingly estimated from different antennas), from which a subspace spanned by the signal or channel and not substantially affected by a momentary fade can be calculated. The terminal thus typically estimates the variables required to calculate a spatial signature by using a channel estimated from at least two base station lobes (or antenna elements).

Let us now examine a signal transmitted by antenna elements 1 and L of a base station 300 that propagates to an antenna element 1 of a terminal 304. Other signals between the antenna elements of the base station and terminal can also be examined in the same manner. Because the signals propagate along several paths, the channel related to the signal propagated along each path can be presented by an estimate describing the channel, such as a channel estimate vector (e.g. a discrete impulse response) h. When the terminal 304 can monitor M paths, it is correspondingly possible to determine M estimates describing the channel for each signal. This way, channel estimates $h_{11}, \ldots h_{12}, \ldots, h_{1M}$ are related to the signal transmitted by the antenna element 1, and channel estimates $h_{L1}, \ldots h_{L2}, \ldots, h_{LM}$ are related to the signal transmitted by the antenna element L, wherein the subscript 31, for instance, refers to the first-path channel estimate of the signal coming from the base station antenna element 3 to the terminal antenna element 1. A terminal may have more than one antenna element, in which case estimates are correspondingly obtained between all transmission antennas and at least one terminal antenna element.

Figure 4A:
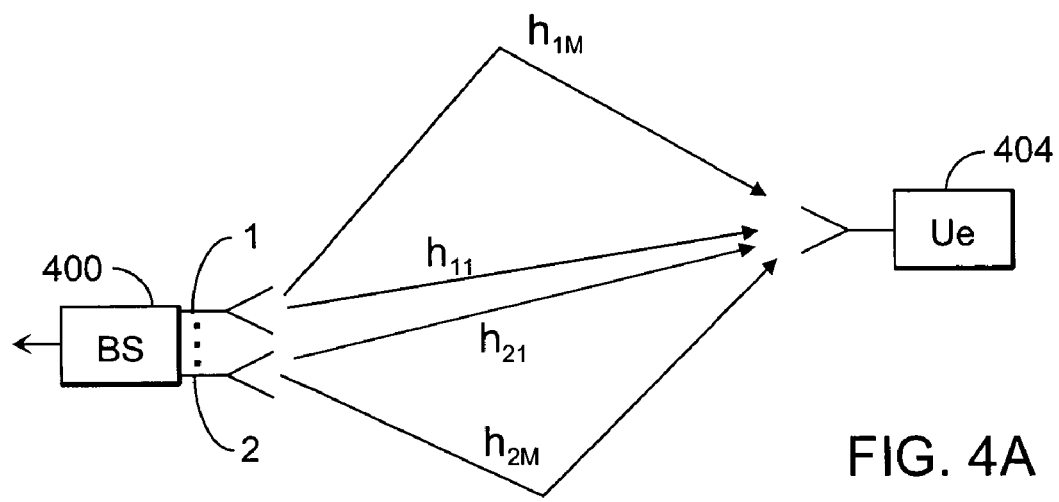
FIG. 4A shows signal propagation between a base station and a terminal.

Let us now examine by means of FIG. 4A a situation in which a base station 400 has only two antenna elements 1 and 2 and a terminal 404 has only one antenna element. Fewer channel estimates are then made and at the same time, it is possible to keep the previous channel estimate indexing. When a receiver has only one antenna element and a transmitter L antenna elements, channel estimates can be presented as a channel matrix H that in its general form is $H=[h_1 \ldots h_L]^T \epsilon C^{L \times M}$, wherein $h_1, \ldots, h_L$ are channel estimate vectors related to different transmission antenna elements or other terms describing the channel, and for instance $h_1=[h_{11} \ldots h_{1M}]^T$, wherein $h_{11}$ is the first temporal tap of the channel estimate, i.e. the tap corresponding to the shortest delay, and $h_M$ is the last tap of the channel estimate, i.e. the tap corresponding to the longest delay. In the case of FIG. 4A, where L=2, the channel matrix is $$H = \begin{bmatrix} h_{11} & \Lambda & h_{1M} \\ h_{21} & \Lambda & h_{2M} \end{bmatrix} \quad (2)$$

The channel matrix can also be expressed by means of delay-specific vectors. Then the m column of the channel matrix that corresponds to the delay component m is presented as its own vector, and the channel matrix can be expressed as $H=[v_1 \ldots v_M]$. Estimates describing the channels of signals that differ from each other are dependent on the locations of the transmitter and receiver in relation to each other, i.e. the estimates describing the channels serve as the signatures of the signals. To make positioning possible, signals transmitted by different antenna elements should be compared with each other by means of the estimates related to the channels. Comparing two stochastic processes, such as the estimates related to the channels are, can be performed by means of correlation or covariance, for instance, because correlation and covariance indicate the relative dependence between the stochastic processes.

One especially advantageous alternative to compare different signals with each other is to use a spatial covariance matrix R that indicates the degree of similarity of signals between two antenna elements. The spatial covariance matrix R describing the channels of at least two different signals can be defined as follows:

$$R = HH^H = c \sum_{i=1}^{M} v_i v_i^H \quad (3)$$

wherein H is the channel matrix and c a normalization constant (e.g. c=1/L). When forming the spatial covariance R, it is possible to take into account all elements of the channel matrix or a section of rows and columns. Subspace can preferably be calculated from the channel estimate elements corresponding to the shortest propagation delay (M=1, assuming that the first index corresponds to the first detected path), because the shortest signal delay most probably means a direct line of sight and thus the actual geometric distance can be determined. In addition, the covariance matrix described above can be calculated for each temporally separate delay component, whereby M separate covariance matrices are obtained for use when calculating the spatial signature of the signal.

The covariance matrix calculation described above only uses one channel estimate, the estimation of which has naturally been possible by using several channel realizations. This has the drawback that an individual estimate is greatly affected by a random combination of signals in the channel, which shows as a signal fade in an individual channel estimate value. The fade typically changes randomly when the receiver is moved a few centimetres or if the signal is transmitted at a different frequency. However, the present solution endeavours to position the terminal in such a manner that a single fade value does not dominate or distort the location estimate. This is achieved by further averaging the above-mentioned covariance matrices over several time instants (the averaging time is preferably longer than the coherence time of the channel) or over a frequency (in which case the channel measurements and covariance matrices are calculated by using identifier signals transmitted on at least two frequencies) or over the covariance matrices of several different receiving antennas, in which case the impact of a fade affecting a single value decreases when estimating the spatial signature of the signal. The specific vector corresponding to the highest specific value of the thus calculated averaged or filtered covariance matrix can be utilized when determining the direction from the transmitter (=often a base station, but can also be a terminal) to the receiver (=often a terminal, but can also be a base station). Alternatively, it is possible to calculate a separate covariance matrix for several delay components filtered in the above-mentioned manner and also use temporal dispersion of the signal and the (relative) size of the specific values of different covariance matrices to form the, spatial signature. A delay path, for instance, is then defined that has the highest specific value energy or specific value energy exceeding a predefined threshold.

In addition, it should be noted that covariance matrices need not necessarily be averaged, but instead, they can be combined by recursive filtering. In addition, the specific vectors and values described above can also be calculated by means of a singular value decomposition known per se, in which case when we are expressly interested in specific values or vectors, the explicit calculation of the covariance matrix can be avoided. This is described in greater detail for instance in publication *Solving the SVD updating problem for subspace tracking on a fixed size of linear array of processors*, C. Sengupta, J. R. Cavallaro and B. Aazhang, International Conference on Acoustics, Speech and Signal Processing (ICASSP), Vol. 5, pp. 4137 to 4140, Munich, April 1997. The solution presented in this application is, however, described by means of covariance matrices.

A covariance matrix can thus be averaged and marked as $R=E(H^H H)$, wherein $E<H^H H>$ refers to the expected value of product $H^H H$, and $H^H$ is the transposed complex conjugate of matrix H, i.e. the Hermite matrix of matrix H. Averaging or filtering can for instance be performed by weighting the newest channel estimates more than the older ones as follows:

$$R_n(i)=\rho R_n(i-1)+(1-\rho)v_n(i)v_n^H(i), \quad (4)$$

where $\rho$ is the forgetting factor, i is the update index of the covariance matrix and n is the index of the time delay. When defining the spatial signature of a signal according to the mean subspaces spanned by the channel, the forgetting factor must be high. If the latest channel realizations are weighted, the forgetting factor must be low.

Figure 4B:
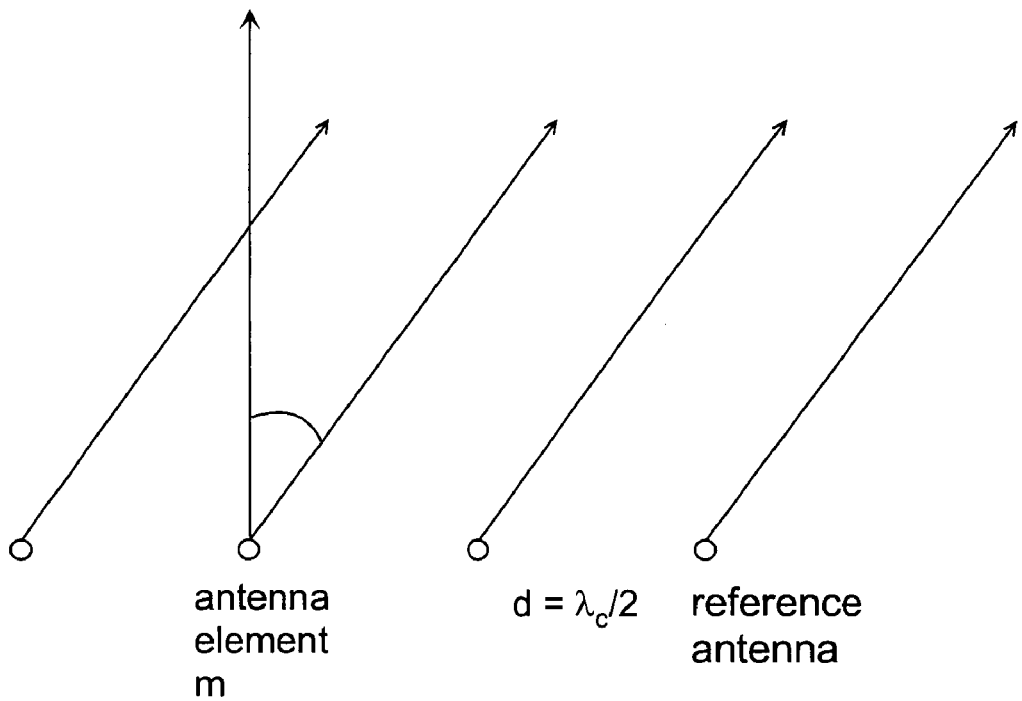
FIG. 4B shows the direction of a wave front in relation to a reference direction.

Let us now assume that the covariance matrix is calculated with one of the above-mentioned values. The transmission direction of the desired paths to the receiver can for instance be determined by maximizing the received power P in relation to direction $\theta$ in the expression $P=w^H(74)\times R\times w(\theta)$, i.e.

$$\max_\theta P = \max_\theta [w^H(\theta) \times R \times w(\theta)]$$

is searched, where the varying parameter is the parameter $\theta$ of the transmission direction and $w(\theta)$ is the weighting coefficient vector defining the transmission direction $\theta$ (or its parameter). The transmission direction can also be calculated directly by means of the spatial signature defined by the above-mentioned highest specific value vector, by comparing it with possible transmission direction vectors and selecting the one that is closest with respect to the given metric. The given metric can be Euclidian metric, the distance of subspaces spanned by specific vectors and the transmission direction vector (e.g. the length of projections for alternative subspaces), or any other metric known per se. The weighting coefficients can be quantized in relation to direction $\theta$ with the desired resolution. The transmission direction $\theta$, in which the received power is highest, corresponds to the direction where the receiver is as seen from the transmitter. It should be noted that the delay components from which the above-mentioned covariance matrix is calculated affect the directional calculation. Generally, all directions and their delays can be used for positioning, but often the use of the first dominant path is enough. The calculated directional parameter $\theta$ is relative to a reference direction of a transmitter diversity antenna that is usually constant in relation to the surroundings. When using a ULA antenna structure, the signal can be parametrized by the model:

$$a(\theta_m)=[1\exp(-j2\pi d\sin(\theta_m)/\lambda_c)\exp(-4j\pi d\sin(\theta_m)/\lambda_c \ldots \exp(-2j\pi(L-1)d\sin(\theta_m)/\lambda_c)]^T \quad (5)$$

where parameter $\theta_m$ is the transmission direction of the $m^{th}$ path. When the elements are at a distance of $d=\lambda_c/2$ from each other, this can be expressed as:

$$a(\theta_m)=[1\exp(-j\pi\sin(\theta_m))\exp(-2\pi\sin(\theta_m))\ldots \exp(-j\pi(L-1)\sin(\theta_m))]^T \quad (6)$$

where $\lambda_c$ is the wavelength of the carrier. FIG. 4B shows a 4-element ULA antenna structure, in which the distance d between elements is half the wavelength $d=\lambda_c/2$. The slanted arrows show the direction of the transmitted wave front and the vertical arrow shows the reference direction. The angle between the transmitted wave front and the reference direction is $\theta$. The last antenna element is a reference antenna element.

The above example shows that a terminal can calculate the transmission direction (or a parameter related to it) in relation to the locations of the transmitter antennas (e.g. in the direction of ULA) by using identifier signals. If the terminal does not know the antenna structure of the base station and/or the locations of its reference antennas, the directional information or spatial signature (e.g. specific vector or quantized specific vectors) should be signalled to the base station that naturally knows the parametrization and the locations of the reference antennas. A network part or the base station can then define the absolute transmission direction. If the positioning is done completely in the terminal, the base station should signal (e.g. on a common channel) enough information (the locations of the reference antennas, antenna parametrization, etc.) to the terminal. The location of the receiver in relation to the transmitter can be determined when the direction of the receiver and its distance from the transmitter are known, or if two different reference antenna arrays are used (in the same base station or in different base stations), the location can be determined without the distance information. Similarly, the location of the transmitter (the station transmitting the identifier signal) in relation to the receiver can be determined, when the direction and distance between the receiver and transmitter, or two directions, or both together, are known. The absolute direction is then typically not needed, but mainly a route to the location from which the identifier signal is transmitted. The location can be determined by means of the spatial signature by comparing an estimated spatial signature to previously known spatial signatures and determining as the location a position whose previously known spatial signature is closest to the estimated spatial signature. In the calculation, it is possible to take into account the specific vectors and specific values calculated for each delay, or the ratios of their powers. In addition, it is possible to take into account the transmission powers of the identifier signals of one base station or different base stations in calculating the spatial signature. This way, it is for instance possible to normalize the spatial signature in such a manner that, instead of channel parameters, elements that are dependent only on the attenuation caused by the distance and not on the reception power (the reception power changes, if the identifier signals are transmitted at different power levels) are used in calculating different spatial signatures.

The distance between the transmitter and receiver can be determined by techniques known per se, for instance by measuring the propagation delay of the signal. In addition, the specific values obtained in calculating the spatial signature typically decrease when the terminal is further away from the base station, and this information can also be utilized together with the delay measurements. Similarly, when the location of the transmitter (base station) is known in relation to the surroundings (e.g. longitudes and latitudes or other map coordinates), the location of the receiver can be determined in relation to the surroundings. The base station naturally knows these parameters and in a preferred embodiment, they can be signalled to the terminal, in which case the positioning of the terminal can be done so that only the terminal knows its own location (the network part then does not know the location of the terminal). The terminal does not then need to transmit the above parameters to the network part or base station, and it can position itself even in idle mode, that is, without a connection to the network part.

Figure 5:
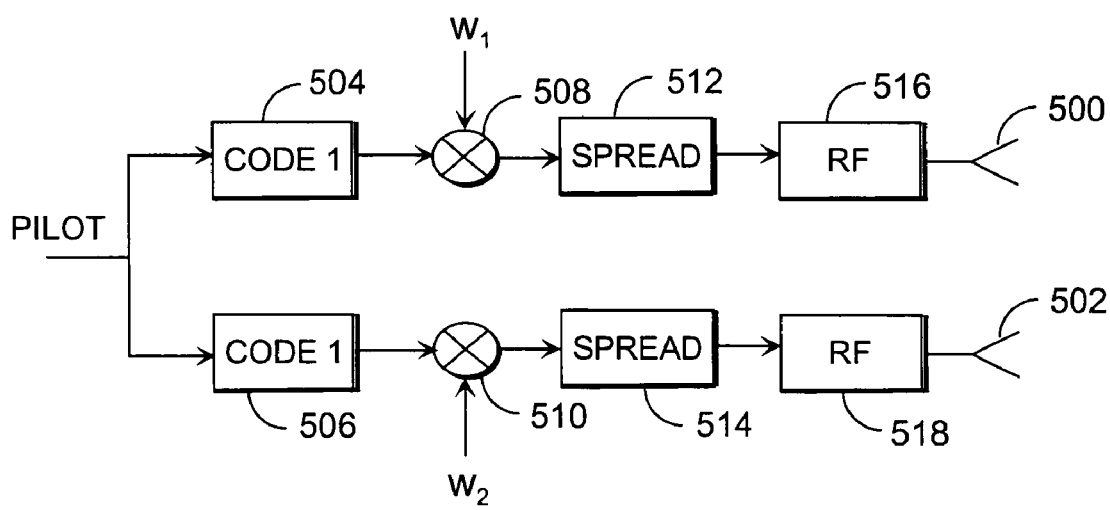
FIG. 5 shows a block diagram of a transmitter section of a base station.

Let us now examine more closely the base station by means of FIG. 5. The base station comprises two antenna elements 500 and 502. In a general solution, the base station has L antenna elements, where $L \geq 2$. Signals, which preferably are pilot signals, transmitted from different antenna elements can be made orthogonal with respect to each other by coding the signals with different orthogonal codes in coding means 504 to 506. Orthogonality is not necessary, but it facilitates the estimation of channel parameters in the terminal. Orthogonal coding methods include Hadamard coding and space-time block coding. In addition, it is possible to transmit a known pilot sequence consecutively from different antennas or lobes (pilot signal hopping).

Mutually orthogonal Hadarmard signals are generated in a CDMA-system transmitter according to prior art in such a manner that a certain number of bits to be transmitted are converted into numbers and each number is used to point to one row of the Hadamard matrix, the rows being orthogonal with respect to each other.

The signals propagate further to multipliers 508 and 510, in which the signal to be transmitted are multiplied by complex weighting coefficients $w_1$ to $w_L$, where L is the number (in the case of FIG. 5, the number is 2) of antenna elements (or lobes). The pilot signals are coded with a spreading code in spreading coding means 512 to 514. The pilot signals can be coded with spreading codes differing from each other in the spreading coding means 512 to 514 especially in case the signal have not been coded with codes differing from each other in the coding means 504 to 506, or if the signals do not have symbol sequences that differ from each other. The codes differing from each other are preferably mutually orthogonal. Pseudo-orthogonal coding is also possible, and obtained for instance by phasing the spreading code or symbol sequence in a different manner in signals transmitted to different antenna elements. After this, the signals are scrambled to radio frequency in radio frequency means 516 to 518, and the radio frequency signals are transmitted through antenna elements 500 to 502. Identifier signal to be transmitted can also be made non-interfering (uncorrelated) with respect to each other by scrambling the signals to different frequencies in the radio frequency means 516 to 518. In addition, the identifier signals can be made non-interfering with respect to each other by transmitting them at different times from different antenna elements 500 to 502. Generally, the same pilot signal can be transmitted from different antenna elements at different times (pilot signal hopping).

Further, by using different weighting coefficients $w_1$ to $w_L$ at different consecutive time instants it is for instance possible to form a narrow reception lobe that is rotated 360°, for instance, around the base station. The terminal then hears the pilot signal directed to different directions at different time instants and it is possible to generate the spatial signature of the signals, thus enabling positioning. If a signal is transmitted in each direction in different time slots, for instance, it is enough that the terminal indicates the time-slot index, in which the estimated channel (or its first dominant path) is strongest. The base station knows from this what the corresponding transmission direction is.

Figure 6:
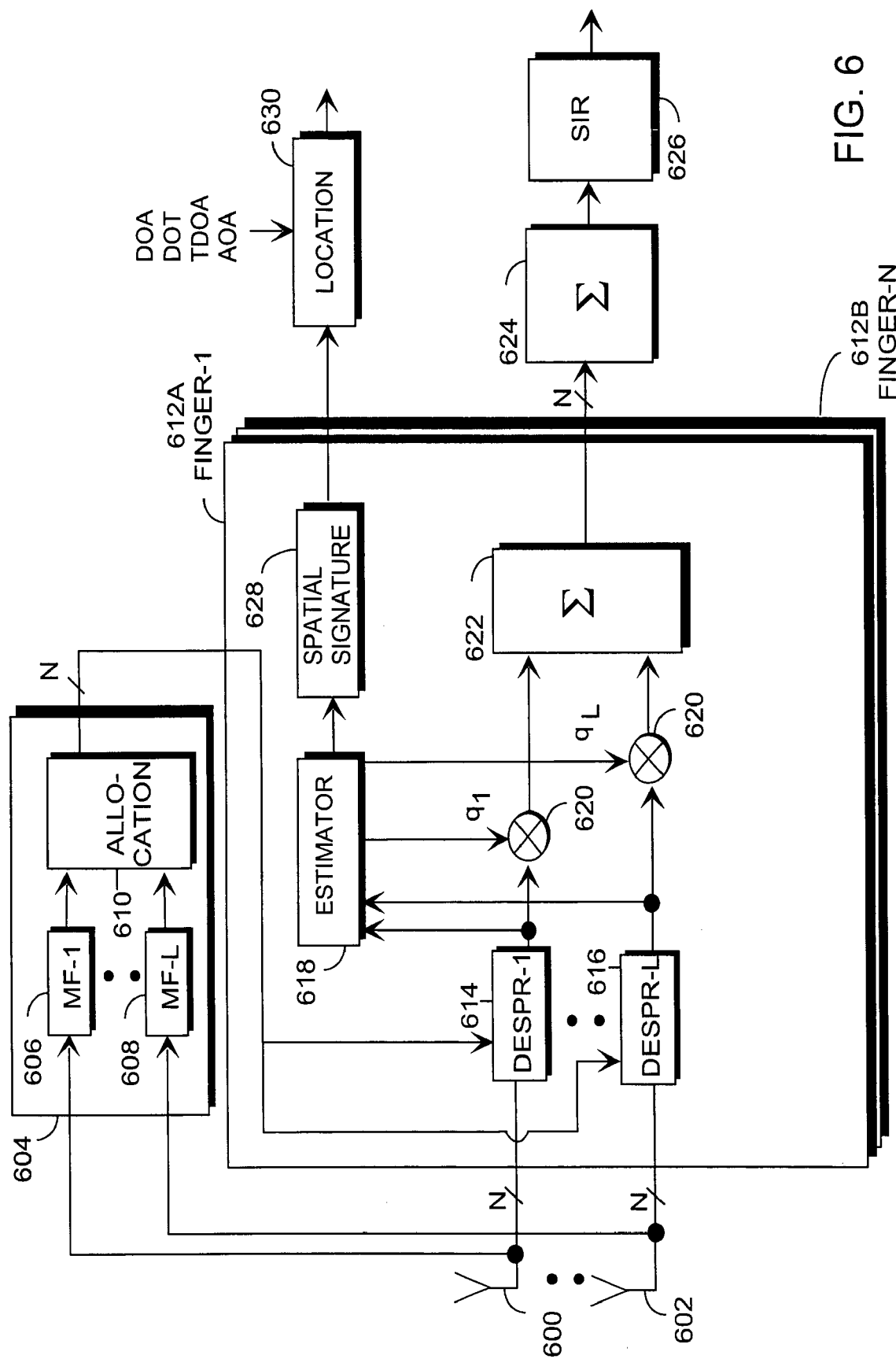
FIG. 6 shows a block diagram of a receiver section of a terminal.

Let us now examine a Rake receiver used in CDMA reception by means of FIG. 6. A multipath-propagated signal is received through antenna elements 600 to 602. There are L antenna elements. FIG. 6 only shows two antenna elements, but there may be one or more. A terminal serving as a mobile phone usually has one antenna element. The signal received from each antenna element 600 to 602 is converted to base band in radio frequency parts (not shown in FIG. 6).

The signal is then taken to a delay estimator 604 that comprises an adapted filter 606 to 608 for each antenna element. The delay estimator 604 finds the delays of the multipath-propagated signal components of the received signal and determines the propagation delay of the signal. An allocator 610 in the delay estimator selects on the basis of calculated correlations the delays that are used by despreading means 614 to 616 of Rake fingers 612A to 612B to remove the spreading coding. When decoding Hadamard coding, for instance, the received signal (corresponds to a row in the Hadamard matrix) is multiplied by the Hadamard matrix. The multiplication corresponds to the correlation between the Hadamard matrix and the transmitted signal, in which the location of the maximum value, i.e. index, of the formed correlation vector corresponds to the value of the transmitted bits. In this example, the number of allocated Rake fingers 612A to 612B is N. Each Rake finger 612A to 612B processes one multipath-propagated signal component with a given code delay.

Each Rake finger 612A to 612B has a channel estimator 618 that defines a channel estimate h having a component for each transmission antenna. The channel estimator 618 also forms complex weighting coefficients $q_1$ to $q_N$ for signals received by the different antenna elements 600 to 602, when there are more than one antenna element. When using only one antenna element, weighting coefficients are not needed. The shape and direction of a reception lobe can be changed by multiplying the signals coming from different antenna elements 600 to 602 by different weighting coefficients $q_1$ to $q_N$ in multipliers 620. Channel estimates are entered into a spatial signature estimator 628 that forms a covariance matrix R, or its specific vectors, related to the spatial signature of signals by means of one or more channel estimates and used to calculate the spatial signature or one of its parametrization, such as transmission direction parameters (DoT). The direction and location of the receiver is determined in the presented manner in block 630 (that can reside either in the base station or in the terminal depending on what is signalled) by possibly utilizing a DOA, AOA, TOA, or TDOA measurement known per se. Block 630 also has information on the antenna structure, its parametrization, and the locations of reference antennas, or the absolute transmission directions of pilot signals and possibly powers.

An antenna branch adder 622 residing last in the Rake finger 612A to 612B combines the weighted pilot signal components into one pilot signal. If there are several antenna elements, the Rake receiver also has a Rake finger adder 624 that combines the pilot signals of the Rake fingers 612A to 612B operating at different delays into a summed pilot signal.

A summed pilot signal, like an individual pilot signal, can further be taken to a signal-to-interference ratio estimator 626 that estimates the signal-to-interference ratio of the channel or summed channel in question. With the obtained signal-to-interference ratio of the channel in question, it is possible to control the power of a closed loop. The signal-to-interference ratio or signal power of a single path can be used when the first dominant path is determined.

When a receiver comprises several antenna elements and when a signal is received from different directions, it is possible to define the best angle of arrival AoA or direction of arrival DOA in the signal-to-interference ratio estimator 626. This definition can be performed using the EVD (Eigen Value Decomposition) method, for instance, and an algorithm based on subspace. The MUSIC (MUltiple Signal Classification) algorithm known per se is the simplest and most commonly used algorithm based on subspace. This type of direction of arrival estimation is described in more detail in publication *Solving the SVD updating problem for subspace tracking on a fixed sized linear array of processors*, C. Sengupta, J. R. Cavallaro, B. Aazhang, IEEE International Conference on Acoustics, Speech, and Signal processing, ICASSP-97, Vol. 5, p. 4137 to 4140, 1997, which is incorporated herein by reference. By comparing the direction of arrival with the direction to which the signal is transmitted from the transmitter, it is possible to know, whether there is a direct line of sight between the transmitter and receiver. If the line of sight exists, the positioning is more reliable. In addition, the above-mentioned measurements can be combined with corresponding parameters calculated by the base station.

In positioning, it is also possible to utilize the TOA measuring known per se, by means of which the propagation delay of the signal between the transmitter and receiver can be defined. Similarly, the TDOA measuring known per se can be utilized in positioning. By combining a known positioning solution with the presented solution, positioning can be made more accurate.

An advantage provided by the terminal performing its own positioning is that location information is not revealed to others. Correspondingly, when the terminal does not perform its own positioning, it signals the measuring result to the base station applying the closed loop feedback employed in the IMT-2000 technology, for instance, by using the FSM (Feedback Signalling Message) signal, for instance, which is a part of the FBI (Feedback Information) feedback in a physical DPCCH (Dedicated Physical Control Channel) channel on an uplink, and the location of the terminal is determined as described by means of the measuring results in the base station or elsewhere in the network part. With respect to feedback, it is also possible to signal power control commands to the base station in accordance with techniques known per se. Feedback and closed loop techniques are described in greater detail in publication *Closed-loop transmit diversity techniques for multi-element transceivers*, A. Hottinen, O. Tirkkonen, R. Wichman, Vehicular Technology Conference, IEEE VTS Fall 2000, Vol, 1, p. 70 to 73, 2000, which is incorporated herein by reference. It is also possible to perform a part of the calculation in the terminal and a part elsewhere in the network part.

Even though the invention has been explained in the above with reference to examples in accordance with the accompanying drawings, it is apparent that the invention is not restricted to them but can be modified in many ways within the scope of the inventive idea disclosed in the attached claims.

What is claimed is:

1. A method for performing positioning in a radio system, the method comprising:
    transmitting at least one identifier signal to at least two different channels, each identifier signal being suited for channel estimation;
    receiving, in a receiver, said at least one identifier signal through at least two different channels;
    estimating, based on the at least one received identifier signal from the at least two different channels, a spatial signature of the channels; and
    defining, based on the spatial signature, information related to a position of the receiver or the transmitter, of the at least one identifier signal.

2. A method as claimed in claim 1, further comprising defining, as the information related to the location, at least one direction between the receiver and transmitter based on the spatial signature of the signals.

3. A method as claimed in claim 1, further comprising defining the information related to the location by comparing an estimated spatial signature with known spatial signatures and defining, as the location, a position whose known spatial signature is closest to the estimated spatial signature.

4. A method as claimed in claim 1, further comprising transmitting the identifier from at least two different antenna elements in order to transmit the identifier signals to the at least two different channels.

5. A method as claimed in claim 1, further comprising defining the information related to the location according to a map coordinate system when the location of at least the transmitter or receiver is specified in the map coordinate system.

6. A method as claimed in claim 1, further comprising forming the spatial signature by utilizing several channel estimate matrices generated at different time instants.

7. A method as claimed in claim 6, further comprising generating from different channel estimates at least one covariance matrix of at least one channel and forming the spatial signature based on at least one specific vector of the covariance matrix.

8. A method as claimed in claim 7, further comprising defining a first dominant delay path by utilizing specific values of the channel covariance matrix calculated for different delay paths or the channel singular values in such a manner that the dominant delay path is the path having the highest specific value energy.

9. A method as claimed in claim 7, further comprising defining a first delay path whose specific value energy exceeds a predefined threshold value.

10. A method as claimed in claim 6, further comprising generating a singular value decomposition for a channel estimate matrix, by means of which specific value vectors of the covariance matrix are defined for the definition of the information related to the location.

11. A method as claimed in claim 1, further comprising forming the spatial signature by utilizing several channel estimate matrices generated on different frequencies.

12. A method as claimed in claim 1, further comprising forming the spatial signature by utilizing several channel estimate matrices calculated from different reception antennas.

13. A method as claimed in claim 1, further comprising utilizing additionally in the positioning at least one of the following measurements:
   defining the direction of arrival as a DOA measurement,
   defining the angle of arrival as an AOA measurement,
   for the purpose of comparing the direction of reception and transmission with each other.

14. A method as claimed in claim 1, further comprising utilizing additionally in the positioning at least one of the following measurements:
   measuring the time of arrival as a TOA measurement,
   measuring the time difference of arrival as a TDOA measurement,
   for the purpose of defining the distance between the transmitter and receiver.

15. A method as claimed in claim 1, wherein in the receiving of said at least one identifier signals, the identifier signals are at least partly uncorrelated.

16. A method as claimed in claim 1, wherein in the receiving of said at least one identifier signals, the identifier signals are orthogonal.

17. A method as claimed in claim 1, further comprising using the elements or parameters of the channel estimate corresponding to the shortest delay in the spatial signature of the signals.

18. A method as claimed in claim 1, further comprising generating the identifier signals in such a manner that the signals are transmitted from the different antenna elements at different time instants.

19. A method as claimed in claim 1, further comprising generating the identifier signals by coding the signals to be substantially non-interfering to each other.

20. A method as claimed in claim 1, further comprising generating the identifier signals by transmitting the signals on different frequencies.

21. A method as claimed in claim 1, wherein in the receiving of said at least one identifier signals, a terminal serves as the receiver and performs its own positioning.

22. A method as claimed in claim 21, further comprising signalling necessary information on the antenna structure or antenna element location of a base station to the terminal.

23. A method as claimed in claim 1, further comprising signalling the spatial signatures or the parameters of the spatial signatures of the received signals to a base station and defining the location of the receiver in the network part of the radio system.

24. A method as claimed in claim 1, further comprising using one or more base stations in defining the location of the receiver.

25. A method as claimed in claim 1, further comprising calculating a received power based on the spatial signature of the signals and maximizing the received power in relation to a transmission direction for the purpose of defining the information related to the location between the transmitter and receiver.

26. A method as claimed in claim 1, further comprising estimating, by the terminal, the position of the transmitter, transmitting the identifier signal.

27. A method as claimed in claim 1, wherein the identifier signals are broadcast signals.

28. A method as claimed in claim 27, wherein the identifier signals are common pilot channel signals of a WCDMA radio system.

29. A method as claimed in claim 1, wherein the identifier signals are channel-specific training sequences.

30. A method as claimed in claim 1, wherein the identifier signals are transmitted on a dedicated channel.

31. A radio system configured to perform positioning the radio system comprising:
   a transmitter;
   a receiver;
   at least one base station; and
   wherein the transmitter comprises an antenna comprising at least two antenna elements;
   the transmitter is configured to transmit at least one identifier signal to at least two different channels, each identifier signal being suited for channel estimation;
   the receiver is configured to receive said at least one identifier signal;
   the receiver is configured to estimate, on the basis of the at least one received identifier signal from the at least two different channels, a spatial signature of the channels; and
   wherein in the radio system, positioning is configured to define, based on the spatial signature, information related to the location of a receiver or a transmitter, of the at least one identifier signal.

32. A radio system as claimed in claim 31, wherein the radio system is further configured to define, as the information related to the location, at least one direction between the receiver and transmitter based on the spatial signature of the signals.

33. A radio system as claimed in claim 31, wherein to transmit the identifier signals to at least two different channels, the transmitter is further configured to transmit the identifier signal from at least two different antenna elements.

34. A radio system as claimed in claim 31, wherein the radio system is further configured to compare an estimated spatial signature with known spatial signatures and to define, as the location, a position whose known spatial signature is closest to the estimated spatial signature.

35. A radio system as claimed in claim 31, wherein in the radio system the location of the transmitter or receiver is specified in a map coordinate system, the radio system is further configured to define the information related to the location according to the map coordinate system.

36. A radio system as claimed in claim 31, wherein in the radio system, the receiver is further configured to form the spatial signature by utilizing several channel estimate matrices generated at different time instants.

37. A radio system as claimed in claim 36, wherein in the radio system, the receiver is further configured to generate from different channel estimates at least one covariance matrix of at least one channel, and to form the spatial signature based on at least one specific vector of the covariance matrix.

38. A radio system as claimed in claim 36, wherein in the radio system, the receiver is further configured to generate a singular value decomposition for a channel estimate matrix, and wherein the receiver is further configured to define specific value vectors of the covariance matrix for the definition of the information related to the location.

39. A radio system as claimed in claim 31, wherein in the radio system the receiver is further configured to form the spatial signature by utilizing several channel estimate matrices generated on different frequencies.

40. A radio system as claimed in claim 39, wherein the radio system is further configured to define a first dominant delay path by utilizing the specific values of the channel covariance matrix calculated for different delay paths or the channel singular values, and the radio system is further configured to define as the dominant delay path the path having the highest specific value energy.

41. A radio system as claimed in claim 39, wherein the radio system is further configured to define a first delay path whose specific value energy exceeds a predefined threshold value.

42. A radio system as claimed in claim 31, wherein in the radio system the receiver is further configured to form the spatial signature by utilizing several channel estimate matrices calculated from different reception antennas.

43. A radio system as claimed in claim 31, wherein the radio system is further configured to utilize in the positioning at least one of the following measurements:
a DOA measurement of the direction of arrival,
an AOA measurement of the angle of arrival,
for the purpose of comparing the direction of reception and transmission with each other.

44. A radio system as claimed in claim 31, wherein the radio system is further configured to utilize in the positioning at least one of the following measurements:
a TOA measurement of the time of arrival,
a TDOA measurement of the time difference of arrival,
for the purpose of defining the distance between the transmitter and receiver.

45. A radio system as claimed in claim 31, wherein the identifier signals are at least partly uncorrelated.

46. A radio system as claimed in claim 31, wherein the identifier signals are orthogonal.

47. A radio system as claimed in claim 31, wherein the identifier signals are broadcast signals.

48. A radio system as claimed in claim 47, wherein the identifier signals are common pilot channel signals of a WCDMA radio system.

49. A radio system as claimed in claim 31, wherein the identifier signals are channel-specific training sequences.

50. A radio system as claimed in claim 31, wherein the identifier signals are transmitted on a dedicated channel.

51. A radio system as claimed in claim 31, wherein the radio system is further configured to use the elements corresponding to the shortest delay in the spatial signature of the signals.

52. A radio system as claimed in claim 31, wherein the base station is further configured to transmit the identifier signals from the different antenna elements at different time instants.

53. A radio system as claimed in claim 31, wherein the base station is further configured to code the identifier signals to be non-interfering to each other.

54. A radio system as claimed in claim 31, wherein the base station is further configured to transmit the identifier signals on different frequencies.

55. A radio system as claimed in claim 31, wherein the terminal is the receiver and adapted to perform its own positioning.

56. A radio system as claimed in claim 55, wherein necessary information on the antenna structure or antenna element location of the base station are signalled to the terminal.

57. A radio system as claimed in claim 31, wherein the terminal is further configured to signal the spatial signatures or the parameters of the spatial signatures of the received signals to the base station and to define the location of the terminal in the network part of the radio system.

58. A radio system as claimed in claim 31, wherein the radio system is further configured to use one or more base stations in defining the location of the terminal.

59. A radio system as claimed in claim 31, wherein the radio system is further configured to calculate the received power based on the spatial signature of the signals, and to maximize the received power in relation to the transmission direction for the purpose of defining the information related to the location.

60. A method for performing positioning in a radio system, the method comprising:
transmitting, from a transmitter, at least one identifier signal to at least two different directions, each identifier signal being suited for channel estimation related to the different directions;
receiving, in a receiver, said at least one identifier signal transmitted through the at least two different directions;
estimating, based on the at least one received identifier signal from the at least two different directions, a spatial signature of the channels; and
defining, based on the spatial signature, information related to the position of the receiver or the transmitter, of the at least one identifier signal.

61. A radio system comprising:
a transmitter;
a receiver; and
at least one base station;
wherein the transmitter comprises an antenna having at least two antenna elements;
the transmitter is configured to transmit at least one identifier signal to at least two different directions, each identifier signal being suited for channel estimation related to the different directions;
the receiver is configured to receive said at least one identifier signal transmitted to said at least two different directions;

the receiver is configured to estimate, based on the at least one received identifier signal from the at least two different directions, a spatial signature of the channels; and wherein in the radio system, positioning is configured to define, based on the spatial signature, information related to the location of the receiver or the transmitter, of the at least one identifier signal.

62. A transmitter in a radio system, the transmitter comprising:

an antenna having at least two antenna elements; and wherein the transmitter is configured to transmit at least one identifier signal to at least two different channels for a receiver to receive the at least on identifier signal, to estimate a spatial signature of the channels based on the at least one identifier signal received from the at least two different channels, and for positioning the receiver or the transmitter of the at least one identifier signal in the radio system based on the spatial signature.

63. A base station in a radio system, the base station comprising:

an antenna having at least two antenna elements; and wherein the base station is configured to transmit at least one identifier signal to at least two different channels for a receiver to receive the at least on identifier signal, to estimate a spatial signature of the channels based on the at least one identifier signal received from said two different channels, and for positioning the receiver or the base station based on the spatial signature.

64. A receiver in a radio system, wherein the receiver is configured to:

receive at least one identifier signal transmitted from a transmitter having an antenna with at least two antenna elements to at least two different channels;

estimate, based on the at least one identifier signal received from the at least two different channels, a spatial signature of the channels for positioning the receiver or the transmitter of the at least one identifier signal.

65. User equipment in a radio system, wherein the user equipment is configured to:

receive at least one identifier signal transmitted from a transmitter having an antenna with at least two antenna elements to at least two different channels;

estimate, based on the at least one identifier signal received from the at least different channels, a spatial signature of the channels for positioning the user equipment or the transmitter.

* * * * *